United States Patent [19]

Mazzorana

[11] 4,080,541

[45] Mar. 21, 1978

[54] ELECTRIC STARTER MOTOR FOR AN ENGINE

[75] Inventor: Alfred Bruno Mazzorana, Venissieux, France

[73] Assignee: Societe de Paris et du Rhone, Lyon, France

[21] Appl. No.: 737,462

[22] Filed: Nov. 1, 1976

[30] Foreign Application Priority Data

Nov. 7, 1975 France .............................. 75 34934

[51] Int. Cl.² ........................ H02K 5/00; F02N 17/00
[52] U.S. Cl. ...................................... 310/89; 310/83; 123/179 M
[58] Field of Search ................... 310/83, 89, 157, 237; 123/179 R, 179 M

[56] References Cited

U.S. PATENT DOCUMENTS

| | | | |
|---|---|---|---|
| 1,598,820 | 9/1926 | Hillmer | 123/179 M |
| 1,760,988 | 6/1930 | Lansing | 310/89 X |
| 2,553,202 | 5/1951 | Metsger | 310/83 X |
| 2,611,274 | 9/1952 | Thorpe | 310/89 UX |
| 3,210,554 | 10/1965 | Seilly et al. | 123/179 M |
| 3,463,951 | 8/1969 | Bauerle et al. | 310/89 X |
| 3,875,436 | 4/1975 | MacFarland | 310/89 X |

FOREIGN PATENT DOCUMENTS

| | | | |
|---|---|---|---|
| 2,233,838 | 1/1974 | Germany | 123/179 M |
| 2,132,724 | 1/1973 | Germany | 123/179 M |
| 533,990 | 9/1931 | Germany | 123/179 M |
| 129,013 | 8/1950 | Sweden | 123/179 M |

*Primary Examiner*—Mark O. Budd
*Attorney, Agent, or Firm*—Dowell & Dowell

[57] ABSTRACT

A starter motor, particularly for internal combustion engines, has, as usual, a motor housing and a drive housing, the latter being provided with a mounting by which it can be fitted to the engine. However, instead of the usual method of joining together the motor housing and the drive housing, the motor housing is constructed to be rigidly secured to the drive housing and to the engine through the means by which the drive housing is attached to the engine. Thus, if the drive housing has an apertured flange for this purpose, the motor housing may also have a flange with corresponding apertures so that the same screw bolts or the like which hold the drive housing in place also hold the motor housing rigidly in position. The brushes are so located that they can be readily replaced without removing the starter.

4 Claims, 3 Drawing Figures

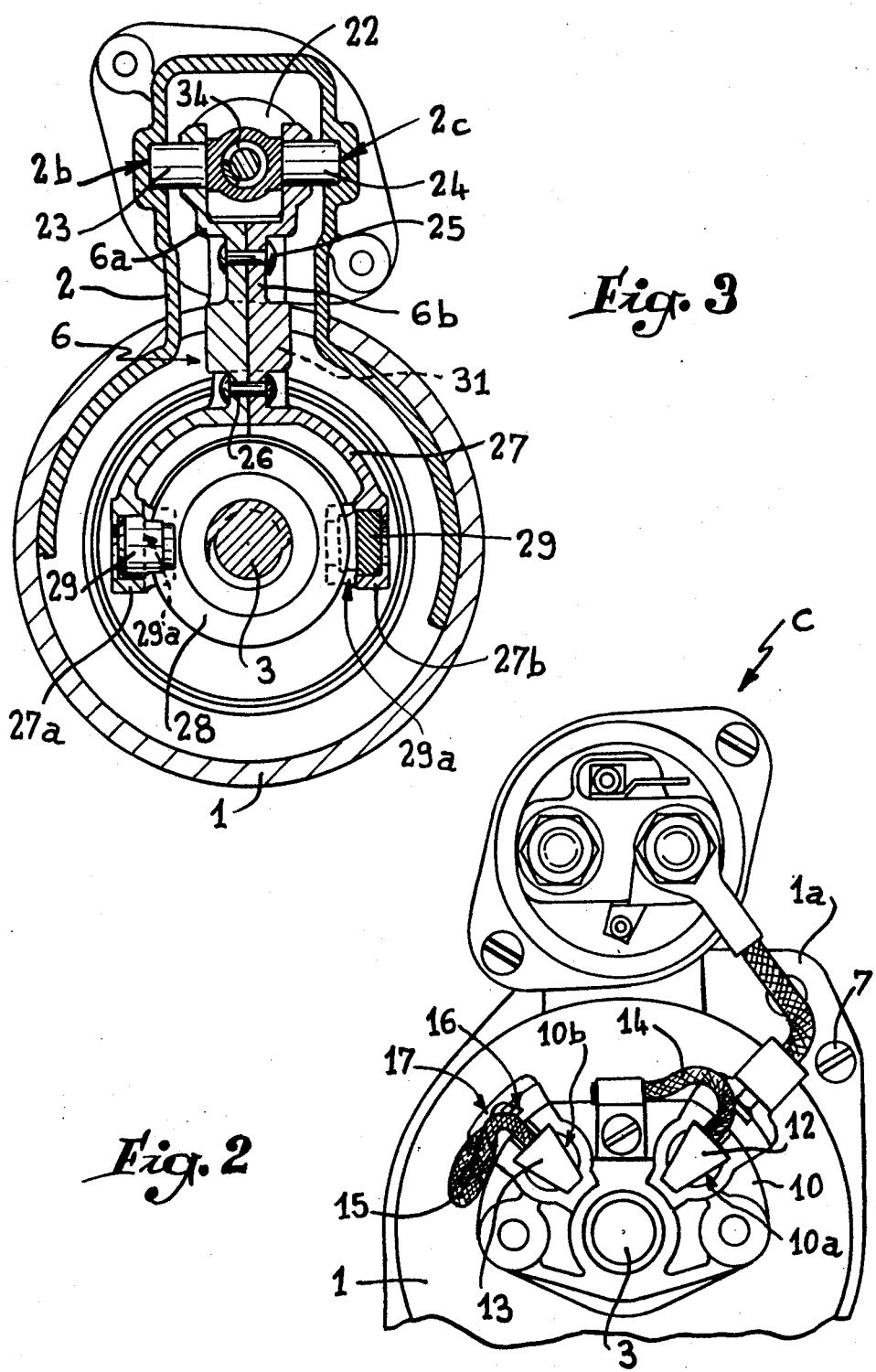

ELECTRIC STARTER MOTOR FOR AN ENGINE

BACKGROUND OF THE INVENTION

The present invention relates to improvements in electric starters, such as are used to start up an internal combustion engine.

Devices of the type in question generally comprise an electric motor, the armature windings of which are located within a housing of magnetic material to which are attached the pole shoes and field cores. The motor housing is secured at one end to a drive housing which is provided with means whereby the starter is secured to the engine, and at the other end of a commutator housing which carries one end bearing of the motor shaft. These parts have to be rigidly secured together and this is usually done by internal rods.

There are various disadvantages in this type of starter. In the first place the production cost is high, both in terms of the cost of manufacture of the separate items and in terms of ease of assembly. Provision must be made for adjustment of the longitudinal position of the starter pinion. Finally the brushes cannot usually be replaced without removing the starter from the engine.

SUMMARY OF THE INVENTION

The present invention provides an electric starter in which the motor housing is constructed to be rigidly secured to the drive housing and to the engine through the means whereby the drive housing is attached to the engine and the brushes are accessible at the end of the motor housing remote from the drive housing. The motor housing may have an end face with an aperture through which the brushes pass. Such a motor housing can readily be made by pressing. Conveniently a face-type commutator may be employed with the brushes biassed parallel to the motor shaft, the brushes passing through an aperture in the end face of the motor housing.

With this construction the end bearing for the motor shaft can be located in an element rigidly secured to the end face of the motor housing, thus giving a firm construction to the assembly.

BRIEF DESCRIPTION OF THE DRAWINGS

One form of the invention is shown in the accompanying drawing, in which:

FIG. 2 is a partial exterior view thereof in the direction of the arrow F in FIG. 1 when the cover protecting the brushes has been removed; and FIG. 3 is a cross-section taken on the line III—III in FIG. 1.

FIG. 1 shows an electric starter for an internal combustion engine such as a motor-car engine, comprising a magnetic housing 1 for the starter motor identified by the general reference M, and a drive housing 2 rigid with this housing and constituting among other functions a forward bearing for the shaft 3 of the motor M. In known manner, a pinion shaft 4 is mounted on the shaft 3 in such a way that it can move longitudinally while remaining angularly keyed on the shaft during its forward movement. This pinion shaft particularly comprises a pinion 4a adapted to engage with a flywheel of the engine. The motor M is energised by the solenoid switch G, of which the movable core 5 is associated with the end of a rocker lever 6 adapted to bring about longitudinal displacement of the pinion shaft 4.

Figure 1:
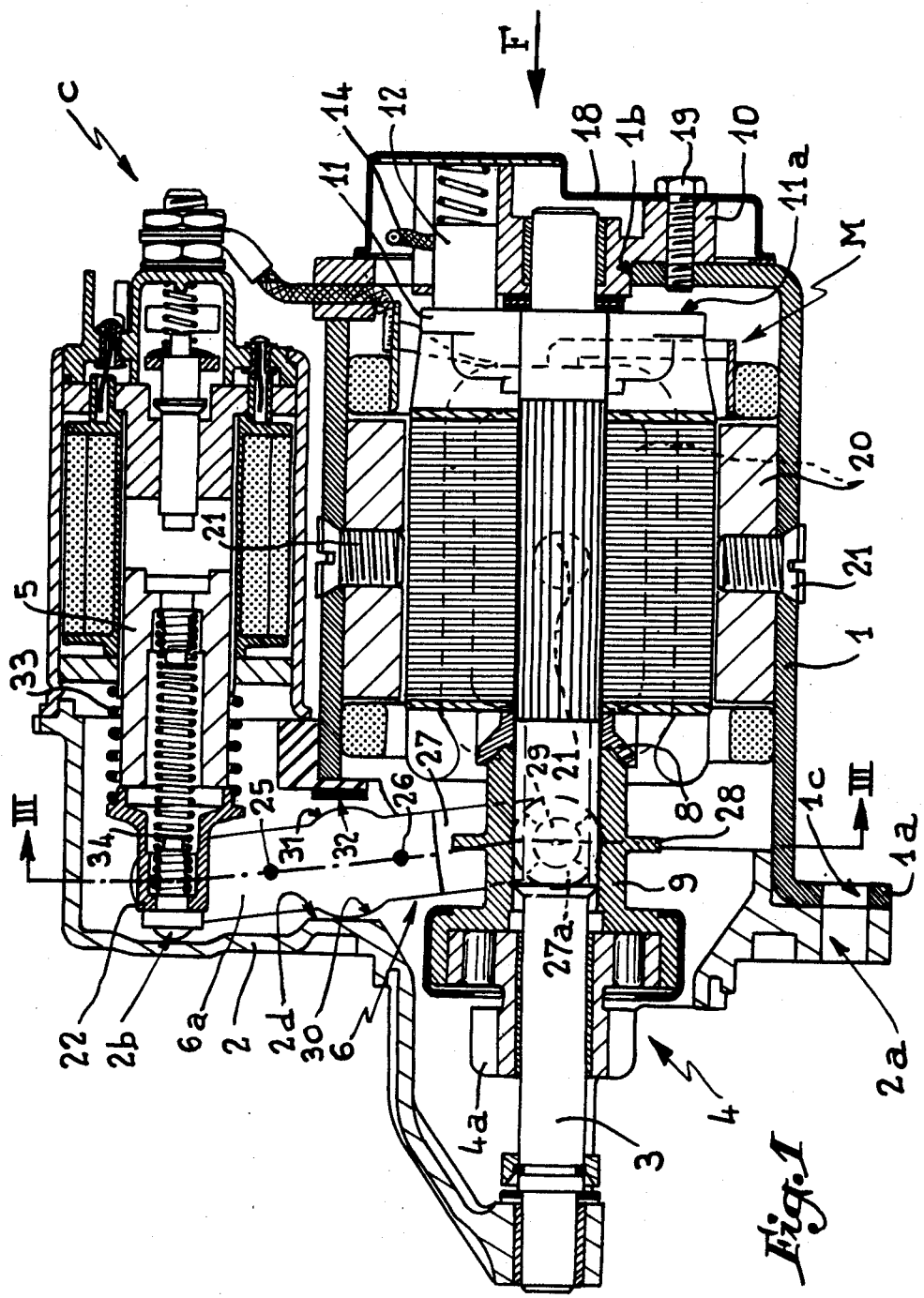
FIG. 1 is a longitudinal section through a starter incorporating the improvements according to the invention.

The motor housing 1 is made in the form of a cylindrically walled body pressed out of a sheet-metal blank, one end having a peripheral flange 1a, while the other end is closed by an end wall having an aperture 1b. Provided in the flange 1a are holes 1c disposed opposite the holes 2a in the flange of the drive housing 2 and it is moreover secured to this flange by means of two fixing screws, one of which is shown at 7 in FIG. 2.

The shaft 3 of the motor carries an armature 11, at one end of which is located a fixed conical dome 8 against which the correspondingly shaped end of the sleeve 9 of the pinion shaft 4 bears when the pinion shaft is at rest.

It will be noted that the rear end of the shaft 3 rotates in a support 10 which extends through the aperture 1b in the end of the housing 1 and which likewise constitutes a brush-holder as will be better explained hereinafter. The ends of the armature windings are terminal to a face-type commutator 11a, orientated at right-angles to the axis of the shaft 3, and opposite the support 10. This latter is traversed by apertures 10a, 10b, orientated at right-angles to the commutator 11a and through each of which extends a brush 12, 13 biassed towards the commutator. One of these brushes is connected to earth through a lead 14, while the other is connected to the field coil winding by means of a lead 15 which is welded directly on a terminal 16 of the last field coil; the therminal 16 penetrates through an aperture 17 provided in the end of the pressed-out housing 1 so that it is readily accessible. Therefore, the brushes are installed after assembly of all the parts of the starter. A protective cover 18 is then screwed over the brush-holder by means of screws 19.

It will be noted from FIG. 1 that the poles 20 of the stator are fixed to the periphery of the housing 1 by means of screws 21.

It will be readily appreciated that the above construction makes it possible to avoid the adjustment of the pinion shaft 4 in the longitudinal direction, rendered necessary in the previous construction by the fact that the elements to be joined in line could have tolerances which, when added together, resulted in a variation in the total length.

It will also be seen that the construction makes it possible to dispense with the interior assembly rods, since fixing with respect to the flange of the drive housing is effected by means of the bolts for mounting the starter on the engine on which it is to be fitted. This elimination of the tie-rods makes it possible to enlarge the field circuit in order to upgrade the specification of the starter, that is to say its torque/power ratio. Furthermore, while retaining the same specifications, the field coils could be manufactured by using more bulky aluminum wires instead of copper wires, resulting in a saving on cost.

Finally, replacing the brushes requires only removal of the protective cap 18 and welding of the wire 15 to the terminal 16 of the field coil, all these operations taking place without the need to dismantle the whole of the starter from the engine with which it is associated.

Further details of the rocker lever 6, the method of mounting it to the movable core 5 and the pinion shaft 4 are given in application Ser. No. 737,370 which was filed contemporaneously with this application.

What is claimed is:

1. An electric starter motor assembly to be secured by bolt means to an engine casing, comprising:
   a drive housing having a first flange therearound shaped to fit the casing and having bolt holes therethrough, the drive housing supporting a shaft bearing displaced on one side of said first flange;
   a motor housing of magnetic material and having a second flange around one end shaped to lie against the other side of said first flange and having bolt holes therethrough aligning with the bolt holes through the first flange, and the motor housing having an aperture through its other end;
   a brush holder member fixed to the motor casing at said aperture and having a shaft supporting bearing;
   magnetic field means in said motor housing and secured thereto;
   a shaft passing through said bearings;
   an armature on said shaft and having commutator means on a face extending at right angles to said shaft and facing said brush-holder, and the brush holder supporting brush means biased for movement parallel to said shaft;
   a pinion in the drive housing and slidably keyed on the shaft; and
   solenoid means energizable with the motor and operative to slide the pinion on the shaft for engagement with the engine.

2. A starter motor assembly as set forth in claim 1, wherein the brush means are removable from the brush holder through said aperture, and the assembly further includes a cover shaped to cover said aperture in the other end of the motor housing and maintain the brush means in the brush holder.

3. A starter motor assembly as set forth in claim 2, wherein said brush means include brushes with flexible leads connected therewith and having free ends readily disconnectable with the motor assembly upon removal of said cover.

4. A starter motor ssembly as set forth in claim 1, wherein said motor housing comprises a deep drawn pressing.

* * * * *